April 6, 1965 D. B. SINCLAIR 3,177,425
ELECTRICAL BRIDGE FOR MEASURING NON-ORTHOGONAL QUANTITIES
Filed Nov. 2, 1959
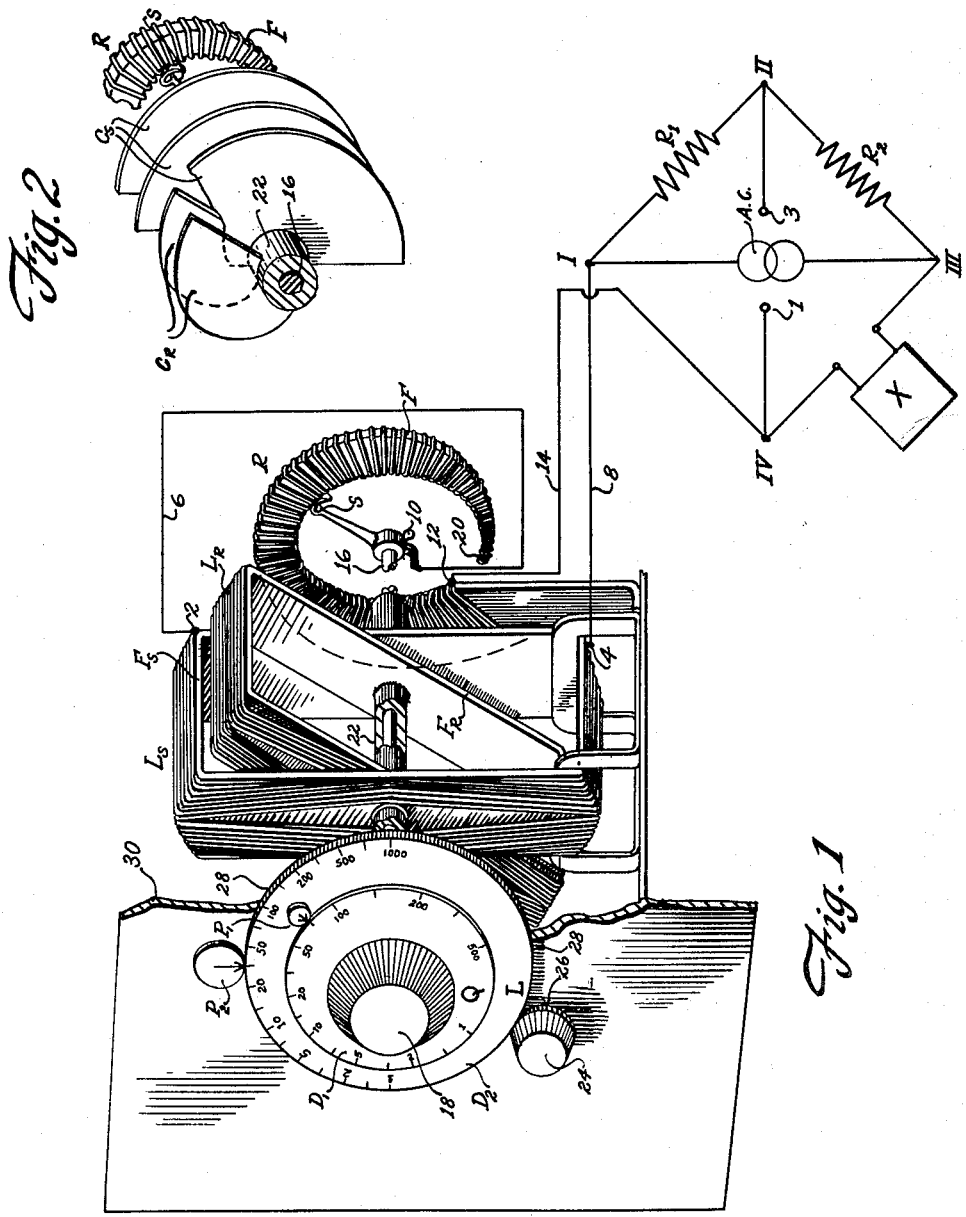
INVENTOR.
DONALD B. SINCLAIR
BY Rines and Rines
ATTORNEYS

United States Patent Office 3,177,425
Patented Apr. 6, 1965

3,177,425
ELECTRICAL BRIDGE FOR MEASURING
NON-ORTHOGONAL QUANTITIES
Donald B. Sinclair, Concord, Mass., assignor to General
Radio Company, Concord, Mass., a corporation of
Massachusetts
Filed Nov. 2, 1959, Ser. No. 850,166
9 Claims. (Cl. 324—57)

The present invention relates to electrical bridges and methods, and more particularly, the bridges that are adapted to indicate electrical quantities having non-orthogonal bridge-balancing relationships.

In United States Letters Patent No. 2,872,639, issued February 3, 1959, to H. P. Hall, there is described a new and improved electrical bridge circuit that enables rapid balancing of a bridge, under conditions where non-orthogonally balancing electrical quantities, such as, for example, inductance L and Q, are to be measured, by obviating what has been termed a "sliding-null" balance or slow convergence of the balance. If the bridge components were balanced to indicate electrical quantities that were either all represented in Cartesian coordinates, or all represented in polar coordinates, no such "sliding-null" problem would exist. Thus, for example, when a bridge is operated to measure or indicate quantities of resistance and inductance, or to measure quantities of impedance and phase angle, no "sliding-null" problems arise. If, however, the bridge is to provide indications in terms of a first electrical quantity having representation in Cartesian coordinates, and a second electrical quantity having representation in polar coordinates, such as the before-mentioned L and Q, then the "sliding-null" balance problems arises, being particularly serious for low Q values or small phase angles near zero.

A very satisfactory solution of this problem is described in the said Letters Patent. There are occasions, however, where it is desirable to obtain readings of non-orthogonally-related electrical quantities, such as L and Q, in a bridge system that is normally adapted to measure electrical parameters that are all definable either in the Cartesian coordinate system, or in the polar coordinate system. The present invention, accordingly, is directed to the concept of modifying such bridge systems to incorporate a computing or converting arrangement that may provide for the indication of non-orthogonally-related electrical quantities, even though the bridge itself is balanced in an orthogonal manner.

Other and further objects will be explained hereinafter, and will be particularly pointed out in connection with the appended claims.

The invention will now be described in connection with the accompanying drawing.

FIG. 1 of which is a combined perspective view and schematic circuit diagram illustrating the invention in preferred form; and FIG. 2 is a fragmentary view of a modification.

Referring to FIG. 1, a typical bridge circuit is illustrated that normally measures the electrical quantities, of for example, resistance and inductance. The bridge comprises four vertices I, II, III and IV, defining therebetween four arms, and input and output circuits. A source of energy, such as an alternating-current generator, labelled "A.C.," is connected in the input between the vertices I and III, and a null-indicating meter or other device, not shown, may be employed to indicate or respond to the condition of bridge balance at the output terminals 1 and 3 connected, respectively, to the vertices IV and II. For purposes of illustration, this bridge is shown comprising, in the first arm, a resistive element $R_1$ connected between the vertices I and II; a second resistive element $R_2$ connected in an adjacent arm between the vertices II and III; and an unknown impedance of value X connected in the next adjacent arm, between the vertices III and IV, for the purpose of obtaining, through appropriate adjustments of the elements of the remaining arm of the bridge, between the terminals I and IV, a balance at the output terminals 1 and 3. At balance, there will be provided a measure of the unknown reactive and resistive components of the unknown impedance element X, as is well known.

In the fourth or variable bridge arm, there are shown connected, for illustrative purposes, a variable inductance element comprising a stator winding $L_s$ and an internally rotatable rotor winding $L_r$, and a variable resistance R. The terminals 2 and 4 at opposite ends of the inductance stator winding $L_s$ are shown connected to respective conductors 6 and 8, the latter of which connects directly to the upper vertex I of the bridge. The conductor 6, leading from the terminal 2 of the stator winding $L_s$, is connected to a commutator contact member 10 that makes electrical contact with a slider S, movable along the winding of the variable resistance element R. The lower terminal 12 of the variable resistance element R is shown connected by a conductor 14 to the vertex IV of the bridge, so that, in effect, there is connected between the vertices IV and I of the bridge circuit, the stator winding $L_s$ of the variable inductance element in series circuit with the portion of the variable resistance element R between the terminal 12 and the slider S.

Adjustment of the values of the variables inductance $L_s—L_r$ and the variable resistance R, to obtain a null reading at the output terminals 1, 3, would, in normal practice, establish measurements of the inductive and resistive components of the unknown impedance element X, as is well known. In accordance with the present invention, however, this type of bridge that would thus normally balance in an orthogonal manner, is adapted or converted to read or measure non-orthogonally balancing quantities. Continuing with the previous illustration of the non-orthogonal electrical quantities L and Q, the windings of the variable inductance element $L_s$ and of the restrictive element R are so shaped, the associated respective impedance-varying controls $L_r$ and S are so designed, and the indication or measurement dials are so calibrated, that while the bridge is balancing in an orthogonal manner, non-orthogonal quantities may be measured, and without the disadvantages of the "sliding-null" approximation adjustments, before described.

In the preferred embodiment of FIG. 1, though it is to be understood that other equivalent arrangements may also be employed, the before-mentioned slider control S of the variable resistance element R, is shown angularly movable or adjustable, in response to the rotation of a shaft 16, under the control of a knob 18 disposed at the left-hand end of the shaft 16. The knob has an indicator dial $D_1$ associated with it that moves as a unit with the knob 18 and thereby changes the angular position of movement of the slider S along the arc defined by the variable resistance element R. In accordance with the present invention, the winding of the resistance R is effected about a form F that is of continuously decreasing width from the terminal 12 down to the thin free end 20 thereof, as shown, such that the value of resistance tapped off between the slider S and the terminal 12 for each successive unit of angular rotation of the knob 18 and shaft 16, will vary exponentially. Otherwise stated, the angle of rotation of the knob 18, the shaft 16 and the slider S, is made proportional to the logarithm of the resistance tapped off along the variable resistance element R.

The forms $F_s$ and $F_r$, associated, respectively, with the stator winding $L_s$ and the rotor winding $L_r$ of the variable inductance element $L_s—L_r$, are similarly designed, as is well known, so that, as the rotor-winding form $F_r$ is rotated in response to movement of an insulating shaft 22, the net inductance value, presented by the element $L_s-L_r$ between the terminals 2 and 4, varies substantially exponentially with the angle of rotation of the shaft 22. Otherwise stated, the angle of rotation of the form $F_r$ is made proporional to the logarithm of the net inductance value of $L_s-L_r$. The shaft 22 is shown substantially concentrically mounted about the shaft 16 that controls the resistance slider S, and the diameter of the inner opening of the shaft 22 that receives the shaft 16 is sufficiently large to permit free and independent rotation of the shaft 16 therein under the control of the knob 18. The shaft 22, in turn, is rotated in response to the rotation of a knob 24, knurled at its inner edge 26 in order to cooperate with the knurled edge 28 of an outer dial $D_2$ secured to the shaft 22.

Further in accordance with the present invention, the indicator dial $D_2$ is angularly calibrated to provide an indication with respect to a fixed pointer $P_2$ that is preferably fixedly secured as a fixed reference to the front panel or other mounting structure 30 of the bridge equipment. The pointer or other indicator member $P_1$, associated with the dial $D_1$, is mounted upon the dial $D_2$, displaced from the calibrations thereupon, so that while it serves as a fixed reference for indicating the rotation of the knob 18 and dial $D_1$, it moves together with the dial $D_2$ with respect to the further fixed reference pointer $P_2$, as the knob 24 is adjusted to vary the value of the variable inductance element $L_s-L_r$.

Through the expedient of the above-mentioned construction, a simple computer system is thus provided for converting the angular positions of the shafts 16 and 22, under the control of respective knobs 18 and 24, to logarithmically distributed dial scale readings or indications, that may provide for the direct reading of the ratio $L/R$, or $Q$. Thus, by calibrating the units of the other dial $D_2$, in units of inductance (such that, for example, 1 millihenry of inductance $L_s-L_r$ is produced at zero-degree deflection or rotation angle of knob 24, 10 millihenries at a deflection angle of one radian, 100 millihenries at a deflection angle of two radians, etc.), as shown by the logarithmic scale labeled L, along the periphery thereof, and by calibrating the inner dial $D_1$ along its periphery in terms of $L/R$ or $Q$, a reading on the dial $D_2$, indicated by the fixed reference pointer $P_2$, will correspond to the adjustment of the logarithmic inductance; whereas, the indication on the inner dial $D_1$ at the region of the pointer $P_1$, will correspond to the angle of rotation of the shaft 16 that produced a logarithmic variation of the variable resistance R. A direct reading of the difference of the scales on the dials, as indicated at the reference pointers $P_2$ and $P_1$, will thus directly give the ratio $L/R$, in view of the logarithmic nature of the variation before-described, so that the Q may be obtained directly, even though the bridge has been balanced in an orthogonal manner.

It is, of course, to be understood that the above example is but a single illustration of a preferred technique for effecting this computation or conversion result, in connection with one particular type of illustrated bridge; but, as explained in the said Letters Patent, it will be equally clear to those skilled in the art that the invention is equally adaptable to the host of other types of bridge circuits that have been evolved and which it is, accordingly, not necessary to illustrate in detail. As a further example, however, in a bridge circuit where variable capacitance is to be employed, instead of the variable inductance of FIG. 1, a stator capacitor-plate system $C_s$ may be used, together with a rotor $C_r$, controlled by the shaft 22. The approximate capacitor-plate shapes shown in FIG. 2 are designed for producing a value of output capacitance that varies substantially exponentially with the angular position of the shaft 22.

Further modifications will also occur to those skilled in the art, and all such are considered to fall within the spirit and scope of the invention, as defined in the appended claims.

What is claimed is:

1. In an electrical bridge having arms that permit of balancing and indicating electrical quantities in either Cartesian coordinates only or in polar coordinates only, apparatus for modifying the said indication to render it direct-reading of electrical quantities in Cartesian and polar coordinates that would normally require a sliding-null balancing procedure, having, in combination, first and second independently variable electrical impedance elements each provided with a variable positioned bridge-balancing control, first and second indicator means, each comprising relatively movable dial and pointer means for indicating by the position of the pointer means along the dial means the respective positions of the controls, each electrical impedance element being shaped to provide an impedance the value of which varies substantially exponentially with the position of the corresponding control, the pointer means corresponding to one of the electrical impedance elements being fixed during movement of the corresponding control but moving with the dial means of the other electrical impedance element during movement of its corresponding control, and the dial means being calibrated to provide indications of non-orthogonal electrical quantities, though the bridge is balanced in an orthogonal manner.

2. In an electrical bridge having arms that permit of balancing and indicating electrical quantities in either Cartesian coordinates only or in polar coordinates only, apparatus for modifying the said indication to render it direct-reading of electrical quantities in Cartesian and polar coordinates that would normally require a sliding-null balancing procedure, having, in combination, first and second independently variable electrical impedance elements each provided with a variably angularly positioned bridge-balancing control, first and second indicator means, each comprising relatively angularly movable dial and pointer means for indicating by the position of the pointer means along the dial means the respective angular positions of the controls, each electrical impedance element being shaped to provide an impedance the value of which varies substantially exponentially with the angular position of the corresponding control, the pointer means corresponding to one of the electrical impedance elements being fixed during movement of the corresponding control but moving angularly with the dial means of the other electrical impedance element during movement of its corresponding control, and the dial means being calibrated to provide indications of non-orthogonal electrical quantities, though the bridge is balanced in an orthogonal manner.

3. Apparatus as claimed in claim 1 and in which the said controls each comprise a rotatable shaft having a knob at one end and a rotatable element at the other end that effects variation in the impedance of the corresponding variable impedance element, one of the shafts being substantially concentrically disposed within the other shaft.

4. Apparatus as claimed in claim 3 and in which the said one shaft is rotatable in response to angular movement of its corresponding knob independently of rotation of the other shaft, and the said pointer means of the said one electrical impedance element is mounted upon the dial means of the said other electrical impedance element.

5. Apparatus for indicating non-orthogonal electrical quantities in an electrical bridge the variable impedance elements of which produce a bridge balance, in response to movement of impedance-element controls, in an orthogonal manner, that comprises, means for moving the impedance-element control of one of the bridge-balancing impedance elements, means for substantially exponentially varying the impedance of the said one element in response to such movement, means for independently moving the impedance-element control of a second of the bridge-balancing impedance elements, means for substantially exponentially varying the impedance of the second element in response to such independent movement, means for indicating the extent of movement of the said one impedance-element control with respect to a fixed first reference, means for indicating the movement of the second impedance-element control with respect to a second fixed reference, and means for moving the said first reference relatively to the second reference during and together with the said movement of the second impedance-element control.

6. Apparatus as claimed in claim 5 and in which one of the said electrical impedance elements is an exponentially variable inductance.

7. Apparatus as claimed in claim 5 and in which one of the said electrical impedance elements is an exponentially variable capacitance.

8. Apparatus as claimed in claim 5 and in which one of the said electrical impedance elements is an exponentially variable resistance.

9. Apparatus as claimed in claim 5 and in which the said electrical impedance elements comprise exponentially variable inductance and resistance elements and the said indicator means are respectively calibrated in units of inductance and Q.

References Cited in the file of this patent
UNITED STATES PATENTS

| | | |
|---|---|---|
| 2,673,030 | Isserstedt | Mar. 23, 1954 |
| 2,872,639 | Hall | Feb. 3, 1959 |
| 2,968,180 | Schafer | Jan. 17, 1961 |

FOREIGN PATENTS

| | | |
|---|---|---|
| 486,130 | Great Britain | May 31, 1938 |
| 625,023 | Great Britain | June 21, 1949 |